United States Patent
Wille et al.

(10) Patent No.: US 8,069,960 B2
(45) Date of Patent: Dec. 6, 2011

(54) SPRING CLIP FOR MOUNTING A SENSOR ON A DISK-BRAKE BRAKESHOE BACKING PLATE

(75) Inventors: Manuel Wille, Rankweil (AT); Günter Jäger, Götzis (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 706 days.

(21) Appl. No.: 12/168,205

(22) Filed: Jul. 7, 2008

(65) Prior Publication Data

US 2010/0000826 A1    Jan. 7, 2010

(30) Foreign Application Priority Data

Jul. 5, 2008    (DE) .......................... 10 2007 031 403

(51) Int. Cl.
*F16D 66/02*    (2006.01)

(52) U.S. Cl. ................... 188/1.11 W; 188/258

(58) Field of Classification Search ............ 188/1.11 W, 188/1.11 L, 1.11 E, 250 B, 250 G, 258
See application file for complete search history.

(56) References Cited

U.S. PATENT DOCUMENTS

| | | | | |
|---|---|---|---|---|
| 4,433,757 A | * | 2/1984 | Warwick et al. | 188/1.11 R |
| 5,678,662 A | * | 10/1997 | Giorgetti et al. | 188/1.11 W |
| 6,290,027 B1 | * | 9/2001 | Matsuzaki | 188/1.11 L |

FOREIGN PATENT DOCUMENTS

| | | |
|---|---|---|
| DE | 7047480 | 9/1971 |
| DE | 3132954 | 8/1981 |
| DE | 3230266 | 8/1982 |
| DE | 3425670 | 2/1986 |
| DE | 3904673 | 2/1989 |
| DE | 4340452 | 11/1993 |
| DE | 69507820 | 9/1995 |
| DE | 102006016851 A1 * | 10/2007 |

\* cited by examiner

*Primary Examiner* — Pamela Rodriguez
(74) *Attorney, Agent, or Firm* — Andrew Wilford

(57) ABSTRACT

A brakeshoe having a backing plate formed with a seat recess opening at a face, is provided with a brakeshoe wear sensor held in place by a U-shaped spring clip. The clip is formed with a pair of legs extending generally parallel to each other and spaced so as to fit around the sensor and a front end extending between the legs and joining same together. The legs and front end fit wholly in the seat recess between the sensor and the backing plate and bear on the sensor and backing plate. A bent-out tab projects transversely from each of the legs and bears outside the recess on the face of the backing plate.

8 Claims, 2 Drawing Sheets

SPRING CLIP FOR MOUNTING A SENSOR ON A DISK-BRAKE BRAKESHOE BACKING PLATE

FIELD OF THE INVENTION

The invention relates to a spring-clip holder for a brakeshoe wear sensor in a brakeshoe backing plate that is designed substantially in a U-shape and holds the wear sensor in sections in a complementary seat of the brakeshoe backing plate in such a manner that it cannot be lost in that parts of legs of the spring clip rest on the seat and on the wear sensor in in an assembly where a substantially U-shaped spring clip holds the wear sensor in sections in a corresponding seat of the brakeshoe backing plate in such a manner that it cannot be lost and parts of legs of the spring clip rest on the seat and on the wear sensor.

BACKGROUND OF THE INVENTION

Brakeshoe wear sensors mounted on a brakeshoe backing plate, detecting wear of a brakeshoe of a disk brake of a motor vehicle, and generating an output signal are known, for example, from DE 34 25 870, DE 32 30 266, DE 31 32 054, DE 43 40 452, DE 39 04 673, DE 70 47 480, or DE 695 07 820.

A generic holder for a brakeshoe wear sensor in a brakeshoe backing plate of a disk brake of a vehicle is known from DE 10 2006 016 851. In this holder a spring clip is also used in which each spring clip leg is designed at least in sections in a corrugated manner such that it has at least four contact points, of which adjacent ones are spaced at least slightly from each other on the brakeshoe backing plate and/or on the sensor housing so that the wear sensor is held substantially without play in the seat on account of the spring action generated by the several contact points. This basically satisfactory spring-clip holder brings ensures that the wear sensor is held under spring force in the seat of the brakeshoe backing plate. As a result of this design of the spring clip noise problems occurring under adverse circumstances are partially but not completely eliminated because it was found in the operation of disk brakes in vehicles that in spite of this known design of the spring clip noise problems still occur.

OBJECT OF THE INVENTION

The invention therefore has the object of eliminating the still occurring noise problems that occur under adverse circumstances from relative motion of the brakeshoe wear sensor relative to the brake so that they no longer occur or no longer occur in a disturbing manner.

SUMMARY OF THE INVENTION

This object is attained in that a bent tab projects from the spring clip in sections and bears at least partially on the face of the brakeshoe backing plate when the wear sensor is inserted into the seat by the spring clip. This at least partially sectional contacting of the bent tab of the spring clip, which is supported on the other side on the wear sensor, on the face of the brakeshoe backing plate, has the advantage that the brakeshoe backing plate can no longer move parallel or perpendicular to the face of the brakeshoe backing plate preferably in neither direction, which eliminates the disturbing noises caused by the previously known possibility of movement. The at least partial bent tabs on the spring clip can be bent from the one front side of the legs of the spring clip, for example, substantially at a right angle, and it is furthermore also conceivable that such bent tabs project on both front sides of the legs of the spring clip and include their surfaces after its insertion into the seat of the backing plate.

Thus, the substantially U-shaped spring clip of the invention offers the advantage that it can be easily installed, which is associated with a simple installation of the brakeshoe wear sensor in the seat of the brakeshoe backing plate. Moreover, such a spring clip can be produced rapidly and economically in large numbers from appropriate material, e.g. spring steel, in a simple process, preferably in a stamp bending process, and offers a solution in an especially advantageous manner for the effective elimination of disturbing noises arising from a motion of the wear sensor relative to the brakeshoe backing plate.

A further special embodiment of the invention can be seen in that a bent tab is provided on a front end of the spring clip, that is, in an area in which the two approximately parallel legs are connected to one another by an curved bight. The mounting of the spring clip is simplified by this bent tab in the area of the front end of the spring clip, optionally also with the aid of the lateral bends, since the spring clip can be inserted into the seat in a guided manner by this front bend.

BRIEF DESCRIPTION OF THE DRAWING

A non-limiting illustrated embodiment of a spring clip is described in the following and explained with reference to the figures. Therein.

DETAILED DESCRIPTION

Figure 1:
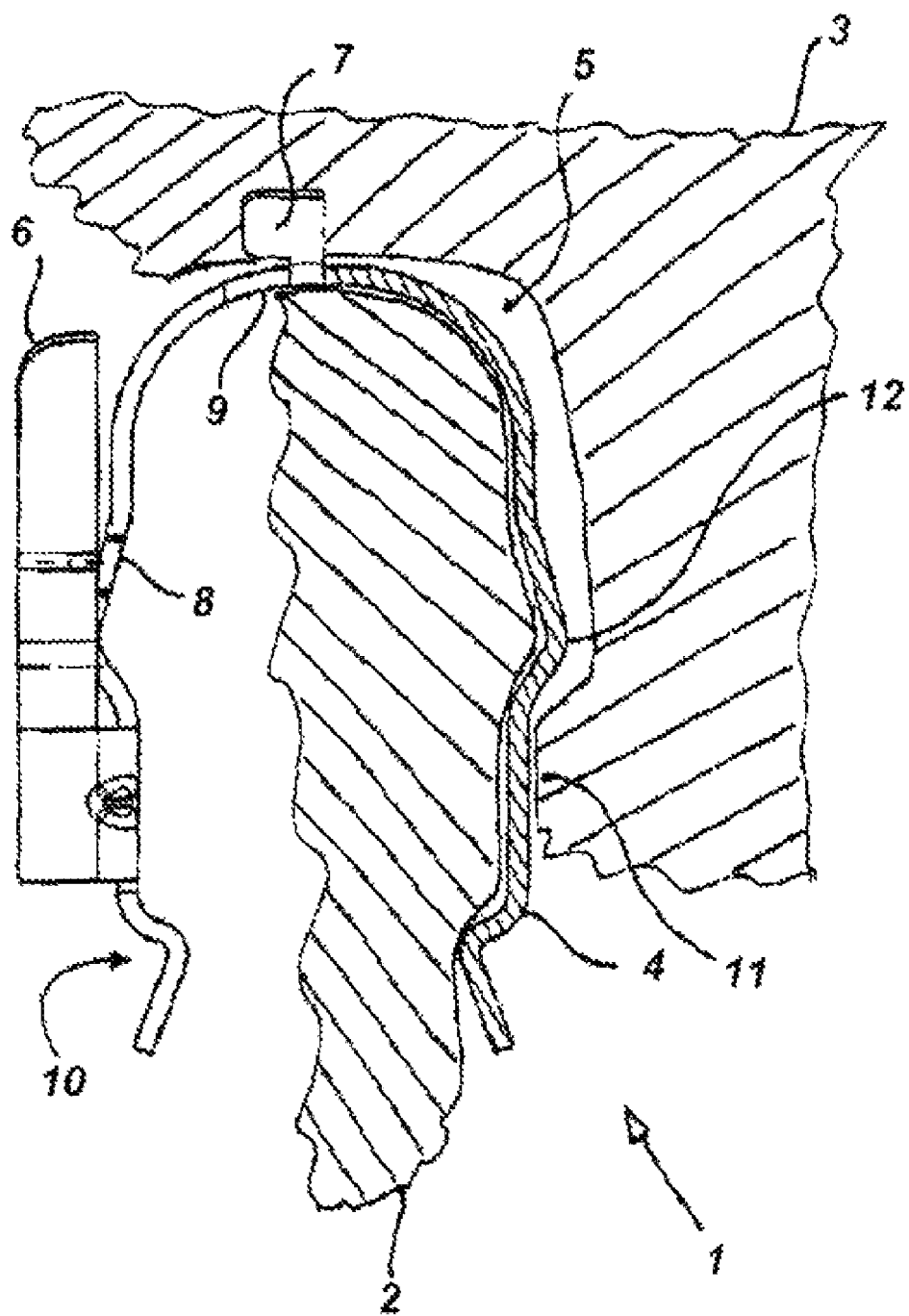
FIG. 1 is a large-scale partly sectional view of the spring clip according to the invention installed on a brakeshoe.

FIGS. 1 to 4 show, in as much as they show details, a holder 1 for a brakeshoe wear sensor 2 shown here in hatched and in section. The wear sensor 2 is held in a brakeshoe backing plate 3, also shown hatched and in section, by a spring clip 4 that is substantially U-shaped and holds the wear sensor 2 at least in sections in a corresponding recess or seat 5 of the brakeshoe backing plate 3 in such a manner that it cannot be lost, and that parts of legs, in particular the lateral and approximately parallel legs of the spring clip 4, bear on the seat 5 and on the wear sensor 2. Inwardly facing bumps 11 located opposite one another can also be provided inside the seat 5 in the brakeshoe backing plate 3, on which bumps 11 the legs of the spring clip 4 closely rest in sections.

The spring clip 4 is characterized in accordance with the invention in that at least one bent tab 6 or 7 projects from a portion of at least one of the legs 8, preferably from both legs 8, and from a front end 9. The bent tabs 6 and 7 come to rest at least partially on the face (FIG. 2) of the brakeshoe backing plate 3 when the wear sensor 2 is inserted into the seat 5 with the spring clip 4. This can be easily seen in FIG. 1 with the bent tab 7 on the front end 9 of the spring clip 4. Note also from FIG. 1 that the bent tab 6 is provided not only on the left leg 8 of the spring clip 4 but also on the right leg. It is likewise conceivable that a bent tab 7 is provided on the front end 9 of the spring clip 4 at only one location at the apex of its arc, but it is also conceivable that more than one bent tab 7 is provided near the apex.

Figure 2:
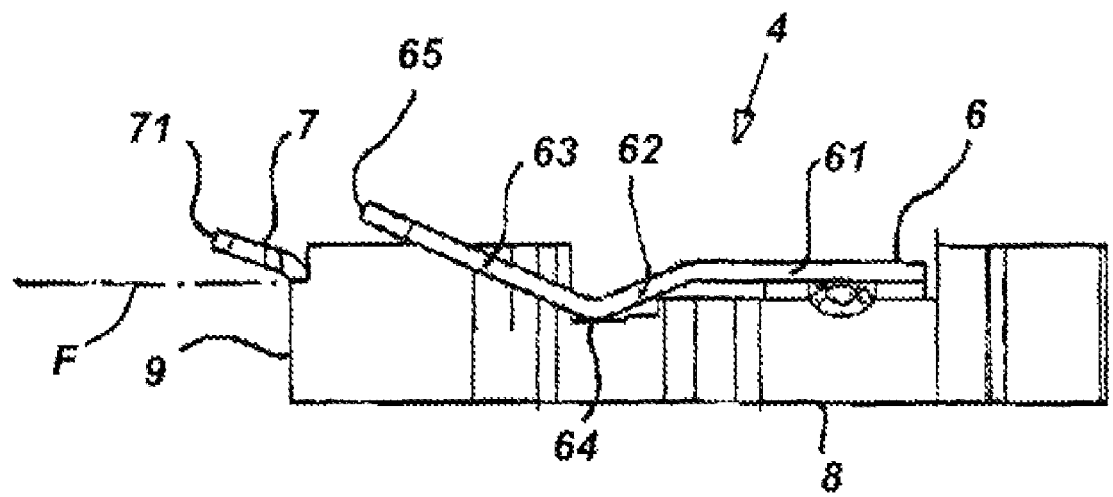
FIG. 2 is a large-scale side elevational view of the spring clip.

FIG. 2 shows the spring clip 4 from the side and clearly shows the legs 8 as well as the arcuate front end 9 that connects the two legs 8 to one another. In this special embodiment the bent tab 6 projecting approximately at a right angle from the leg 8 is designed in a special form in its axial extension. A first section 61, via which this bent tab is joined to the leg 8, connects to a section 62 that is angled downward as shown in FIG. 2 and that is followed by another section 63 that is angled upward. The intersection of the two section 62 and 63 forms a contact point 64 by means of which the bent tab 6 bears on the face of the brakeshoe backing plate 3 when installed therein. An outer end 65 of the section 63 is angled upward and facilitates guided insertion of the spring clip 4 into the seat 5 of the brakeshoe backing plate 3 by means of this shape and alignment.

The same applies to the bent tab 7 at the front end 9, which is also upwardly directed in its front end region 71 in order to facilitate insertion of the spring clip 4 into the seat 5. The plane of the face of the brakeshoe backing plate 3 is indicated in dotted lines on the left in FIG. 2 so that the spring clip 4 is supported by the front bent tab 7 at least in from the front end 9 to a front end 71 of the bent tab 7 on the brakeshoe backing plate 3, and thus forms a positive lock in this area between the brakeshoe backing plate 3 and the wear sensor 2. The same applies to the bent tab 6 that, however, secures the wear sensor 2 with a spring force against the brakeshoe backing plate 3, since the free sections 61 (only partially) as well as 62 and 63 are deflected upward as shown in FIG. 2 during the insertion of the wear sensor 2 in the brakeshoe backing plate 3, so that after insertion the contact point 64 bears on the face of the brakeshoe backing plate 3.

Figure 3:
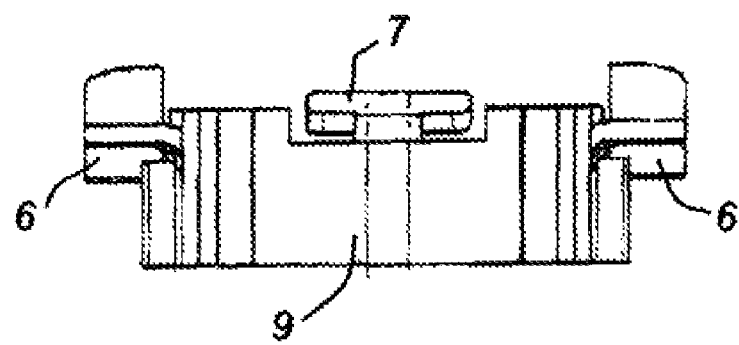
FIG. 3 is a large-scale and elevational view of the spring clip.
Figure 4:
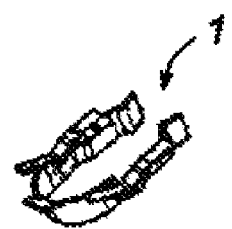
FIG. 4 is a small-scale perspective view of the spring clip.

FIG. 3 shows for the sake of completeness the spring clip 4 when viewed from the front end 9 and FIG. 4 shows a spring clip designed in accordance with the invention on a scale of 1:1.

In designing a spring clip 4 the following is noted. The bent tabs 6 and 7 can be designed in one piece together with the spring clip 4 so that the spring clip 4 is stamped out of a strip of sheet metal and is bent into the desired shape. In addition, it is conceivable that the bent tab 6 and/or 7 is/are designed at first as separate structural components and then are joined by an appropriate process such as, e.g., soldering or welding to the spring clip 4.

Moreover, the spring clip 4 is open away from the front end 9 and also has a bend 10 on its open end, which bend 10 (FIG. 1) facilitates handling of spring clip 4 during insertion into the seat 5, since at first a larger opening for the wear sensor 2 is formed by these bends 10 so that this sensor can be fitted together with the spring clip 4 more readily into the seat 5.

The bent tab 7 on the front end 9 of the spring clip 4 can be wider, equally wide or narrower that the transition area at the front of the spring clip 4 at the front end 9. Preferably, as shown in FIG. 1, the transition area of the spring clip 4 is narrower in the direction of bent tab 7 than the width of the entire bent tab 7 in order to make possible a sufficiently large contact surface and support of the spring clip 4 on the face of the brakeshoe backing plate 3.

Even in this embodiment the brakeshoe backing plate 3 has inwardly facing bumps 11 on which the spring clip 4 is supported with its leg in sections and preferably parallel. As shown in FIG. 1 in the installation direction the spring clip 4 widens out to a widened-out area 12 that bears to rest in the installation direction in front of the bumps 11 after insertion of the spring clip 4 into the seat 5 so that as a result the spring clip 4 is inserted into the seat 5 in such a manner that it cannot be lost.

The invention claimed is:

1. In combination:
    a brakeshoe having a backing plate formed with a seat recess opening at a face;
    a brakeshoe wear sensor; and
    a U-shaped spring clip formed with
        a pair of legs extending generally parallel to each other and spaced so as to fit around the sensor,
        a front end extending between the legs and joining same together, the legs and front end fitting wholly in the seat recess inward of the face between the sensor and the backing plate and bearing on the sensor and backing plate, and
        a pair of bent out and transversely projecting tabs each formed on a respective one of the legs and bearing outside the recess on the face of the backing plate.

2. The combination defined in claim 1 wherein the spring clip has another such tab on the front end.

3. The combination defined in claim 1 wherein the tabs each have a front end that is angled upward away from the spring clip and that forms a short contact region bearing on the face.

4. The combination defined in claim 1 wherein the tabs lie at least partially in a plane perpendicular to an upper surface of the spring clip.

5. The combination defined in claim 1 wherein the spring clip is unitarily formed with the legs, front end, and tabs.

6. The combination defined in claim 1 wherein the tabs are formed separately from the legs and front end and are connected thereto by a joint.

7. In combination:
    a brakeshoe having a backing plate formed with a seat recess opening at a face;
    a brakeshoe wear sensor; and
    a U-shaped spring clip formed with
        a pair of legs extending generally parallel to each other and spaced so as to fit around the sensor,
        a front end extending between the legs and joining same together, the legs and front end fitting wholly in the seat recess between the sensor and the backing plate and bearing on the sensor and backing plate, and
        a bent out and transversely projecting tab on one of the legs, bearing outside the recess on the face of the backing plate, and having
            a first rear section connected to the one leg and extending generally parallel to the face,
            a second section extending forward from the first section and angled downward therefrom toward the face, and
            a third section extending forward from the second section and angled upward therefrom away from the face, an intersection between the second and third sections bearing downward on the face.

8. In combination:
    a brakeshoe having a backing plate formed with a seat recess opening at a face;
    a brakeshoe wear sensor; and
    a U-shaped spring clip formed with
        a pair of generally parallel legs fitting around the sensor,
        a front end extending as a bight between the legs and joining same together, the legs and front end fitting wholly in the seat recess between the sensor and the backing plate and having bent-in portions bearing on the sensor and bent-out portions bearing on the backing plate,
        respective bent out and transversely projecting tabs on the legs bearing outside the recess on the face of the backing plate and each having a portion extending generally parallel to the face, and a portion extending at a small acute angle to the face and forming a ridge bearing on the face, and a respective bent-out and transversely projecting tab on the front end extending at a small acute angle to the face.

* * * * *